(12) United States Patent
Mulligan et al.

(10) Patent No.: US 8,695,533 B1
(45) Date of Patent: Apr. 15, 2014

(54) MODULAR CAT STATION

(75) Inventors: Leesa Ann Mulligan, Sunrise, FL (US);
Jonathan Stone, Cooper City, FL (US);
Marlin Brinson, Miami, FL (US); Todd Anthony Woodward, Miami, FL (US);
Anthony Alphonso Brown, Miami, FL (US); Lewis Stephen Albury, Loxahatchee, FL (US); Juan Ascencio, Miami, FL (US); Jorge Amaro, Miami, FL (US); Carlos Urbina, Caracas (VE)

(73) Assignee: TheCattitude, LLC, Hialeah, FL (US)

( * ) Notice: Subject to any disclaimer, the term of this patent is extended or adjusted under 35 U.S.C. 154(b) by 0 days.

(21) Appl. No.: 13/195,558

(22) Filed: Aug. 1, 2011

Related U.S. Application Data

(60) Provisional application No. 61/412,896, filed on Nov. 12, 2010, provisional application No. 61/400,761, filed on Aug. 2, 2010.

(51) Int. Cl.
*A01K 1/035* (2006.01)

(52) U.S. Cl.
USPC .......................................... 119/28.5; 119/706

(58) Field of Classification Search
USPC .............. 119/28.5, 702, 705, 706; 428/7, 8, 9
See application file for complete search history.

(56) References Cited

U.S. PATENT DOCUMENTS

| | | | | |
|---|---|---|---|---|
| 2,143,592 A * | 1/1939 | Baldeck | ........................ | 211/134 |
| 3,059,366 A * | 10/1962 | Kafka et al. | ........................ | 428/7 |
| 3,214,318 A * | 10/1965 | Snow | ................................ | 428/8 |
| 3,437,060 A * | 4/1969 | Giambalvo | ..................... | 108/151 |
| 3,479,990 A * | 11/1969 | Crow | ............................ | 119/28.5 |
| 3,479,991 A * | 11/1969 | Lichtenberger | ............... | 119/28.5 |
| 3,595,209 A * | 7/1971 | Parker | ............................ | 119/706 |
| D222,276 S * | 10/1971 | Hughes, Jr. | ................... | D30/160 |
| 3,674,612 A * | 7/1972 | Gehl, Jr. | ............................ | 428/7 |
| 3,829,349 A * | 8/1974 | Hermanson | ....................... | 428/8 |
| D233,844 S * | 12/1974 | Tucker | .......................... | D30/160 |
| 4,273,814 A * | 6/1981 | Koehler | ............................ | 428/8 |
| D269,771 S * | 7/1983 | Williams | ...................... | D11/118 |
| 4,399,172 A * | 8/1983 | DeCosmo | .......................... | 428/8 |
| 5,054,429 A | 10/1991 | Bradford | | |
| 5,178,286 A * | 1/1993 | Allison, III | ................. | 211/85.23 |
| D336,557 S * | 6/1993 | Wade | ............................ | D30/160 |
| 5,577,466 A * | 11/1996 | Luxford | ........................ | 119/706 |
| D394,362 S | 5/1998 | Eskdale | | |
| 5,829,390 A * | 11/1998 | Jonilla et al. | ................... | 119/706 |
| 5,875,735 A * | 3/1999 | Bradley et al. | ................ | 119/706 |
| 5,884,586 A * | 3/1999 | Carbonelli | .................... | 119/485 |
| D414,056 S | 9/1999 | Palm et al. | | |
| 6,024,053 A * | 2/2000 | Huang | ........................... | 119/707 |
| D422,754 S | 4/2000 | Kolozsvari et al. | | |
| D435,703 S | 12/2000 | Coudare et al. | | |
| D460,222 S * | 7/2002 | DeRaspe-Bolles et al. | . | D30/160 |

(Continued)

*Primary Examiner* — Yvonne Abbott
(74) *Attorney, Agent, or Firm* — Benjamin M. Hanrahan; Hanrahan Law Firm, P.A.

(57) ABSTRACT

A modular cat station comprising a plurality of spaced apart platforms disposed at different heights relative to a connected base plate is presented. In particular, the different platforms are removably connected to either the base plate and/or each other in order to create a modular, customized, and collapsible cat station. In addition, the cat station comprises a plurality of camouflaging elements generally representative of leaves, branches, flowers, twigs, and/or other parts of a tree or other plant life in order to at least partially conceal one or more accessories, add-ons, or portions of the station, including scratching posts, toys, food and water bowls, beds, litter box, etc.

23 Claims, 21 Drawing Sheets

(56) References Cited

U.S. PATENT DOCUMENTS

| | | | |
|---|---|---|---|
| D461,026 S * | 7/2002 | Mason | D30/160 |
| 6,431,120 B1 * | 8/2002 | Feldman | 119/706 |
| 6,490,997 B1 * | 12/2002 | Biermann et al. | 119/706 |
| D473,020 S * | 4/2003 | DeRaspe-Bolles et al. | D30/160 |
| 6,966,277 B2 * | 11/2005 | DeRaspe-Bolles et al. | 119/706 |
| D541,038 S | 4/2007 | Barthelmess | |
| D549,985 S * | 9/2007 | Carroll et al. | D6/405 |
| 7,770,540 B2 * | 8/2010 | Halpern | 119/706 |
| D635,307 S * | 3/2011 | Harmon | D30/160 |
| D668,002 S * | 9/2012 | Mulligan et al. | D30/130 |
| D668,006 S * | 9/2012 | Mulligan et al. | D30/160 |
| 2002/0121243 A1 * | 9/2002 | Martyn | 119/28.5 |
| 2002/0179021 A1 * | 12/2002 | DeRaspe-Bolles et al. | 119/706 |
| 2003/0192486 A1 * | 10/2003 | DeRaspe-Bolles et al. | 119/706 |
| 2003/0221628 A1 * | 12/2003 | Leon | 119/28.5 |
| 2005/0284407 A1 * | 12/2005 | DeRaspe-Bolles et al. | 119/706 |
| 2007/0289209 A1 * | 12/2007 | Hager | 47/39 |
| 2008/0149042 A1 * | 6/2008 | Halpern | 119/706 |
| 2009/0050072 A1 * | 2/2009 | Moser et al. | 119/706 |
| 2011/0155073 A1 * | 6/2011 | Kilroy | 119/247 |
| 2011/0253060 A1 * | 10/2011 | Schotthoefer et al. | 119/706 |

* cited by examiner

MODULAR CAT STATION

CLAIM OF PRIORITY

The present application is based on and a claim to priority is made under 35 U.S.C. Section 119(e) to two currently pending provisional patent applications, namely, U.S. Provisional Patent Application Ser. No. 61/412,896, having a filing date of Nov. 12, 2010, and U.S. Provisional Patent Application Ser. No. 61/400,761, having a filing date of Aug. 2, 2010, both of which are incorporated herein by reference in their entirety.

BACKGROUND OF THE INVENTION

1. Field of the Invention

The present invention is generally directed to a modular cat station easily disposable between a collapsed configuration (for shipping, storage, etc.) and an assembled configuration. In particular, the cat station comprises a plurality of spaced apart platforms disposed at different heights relative to a connected or otherwise supporting base plate. In particular, the different platforms are removably interconnected to one or more collars, the base plate, and/or each other in order to create a modular, customized, and collapsible cat station. As will be described in greater detail below, the cat station of the various embodiments further comprises a plurality of camouflaging or auxiliary elements generally representative of leaves, branches, flowers, twigs, grass, and/or other parts of a tree or other plant life. The camouflaging elements are removably and/or fixedly connected to various points of the station and are structured and disposed to at least partially conceal one or more accessories, add-ons, or portions of the station, including scratching posts, toys, food and water bowls, beds, litter box, etc.

2. Description of the Related Art

Cats are common domesticated animals owned as pets in many households throughout the United States and Worldwide. A typical behavior common in many household cats is the desire to hide, play, and rest in a designated area. In addition, most cats have a natural tendency to hook their claws into a suitable surface and pull by scratching the surface. This type of behavior marks the cats' territory, exercises the cats' legs, and cleans and sharpens the cats' claws. Indoor cats may benefit from being provided access to one or more scratching posts or other designated scratching areas so they are less likely to scratch other more sensitive portions of the house, including the carpet or furniture, which can be easily ruined by such behavior.

Accordingly, some cat owners purchase or otherwise install in their home designated cat furniture in order for the cat to have a place to play and/or rest. Such cat furniture, cat homes, or cat houses, are generally unsightly, bulky, expensive, non-customizable, and use up a large amount of space.

There is thus a need in the art for a new modular cat station comprising a plurality of platforms disposed in a spaced relation to one another at different heights relative to a base plate. In particular, it would be advantageous if the proposed cat station comprises removable, replaceable, and positionable platforms which can be customized, moved, added, and removed in order to accommodate each specific need. In addition, it would be further beneficial if the cat station comprises a plurality of camouflaging elements, such as various structures representative of tree branches, leaves, flowers, grass etc., in order to conceal or camouflage certain portions of the station and/or one or more accessories or add-ons, including food and water bowls, toys, etc.

SUMMARY OF THE INVENTION

As described in detail herein, the present invention is directed to a modular cat station comprising a plurality of customizable, positionable, and removable platforms and intermediate collars. In particular, the cat station comprises a bottom support base capable of supporting the plurality of interconnected platforms and collars. Depending on the user's desires, special constraints, or other factors, the user may choose to interconnect any number of platform and collar pairs in order to assemble a customized cat station. Each platform may comprise different eating, sleeping and playing components for the cat.

In addition, and as will become apparent from the following discussion, the cat station of at least one embodiment comprises a plurality of camouflaging elements removably or fixedly attached to portions of the station, including to the base, platforms, and/or collars. The various camouflaging elements are structured to resemble portions of a tree, a tree branch, flowers, leaves, etc. in order to at least partially conceal or camouflage various items disposed on the platforms, including food and water bowls, toys, beds, etc. Of course the camouflaging elements may also serve to at least partially conceal the platforms, collars, base and/or other portions of the cat station of the present invention. In any event, the cat station is structured to be aesthetically pleasing in virtually any home by resembling an artificial tree or other plant-life.

In addition, the platforms and/or collars of the various embodiments may comprise a surface or structure capable of facilitating or withstanding excessive cat scratching. Accordingly, the collar and/or platforms may comprise carpet, padding, rope, or other materials such as those found on scratching posts or otherwise structured to facilitate the practice of the present invention in the intended manner.

These and other objects, features and advantages of the present invention will become clearer when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION OF THE PREFERRED EMBODIMENT

Figure 1:
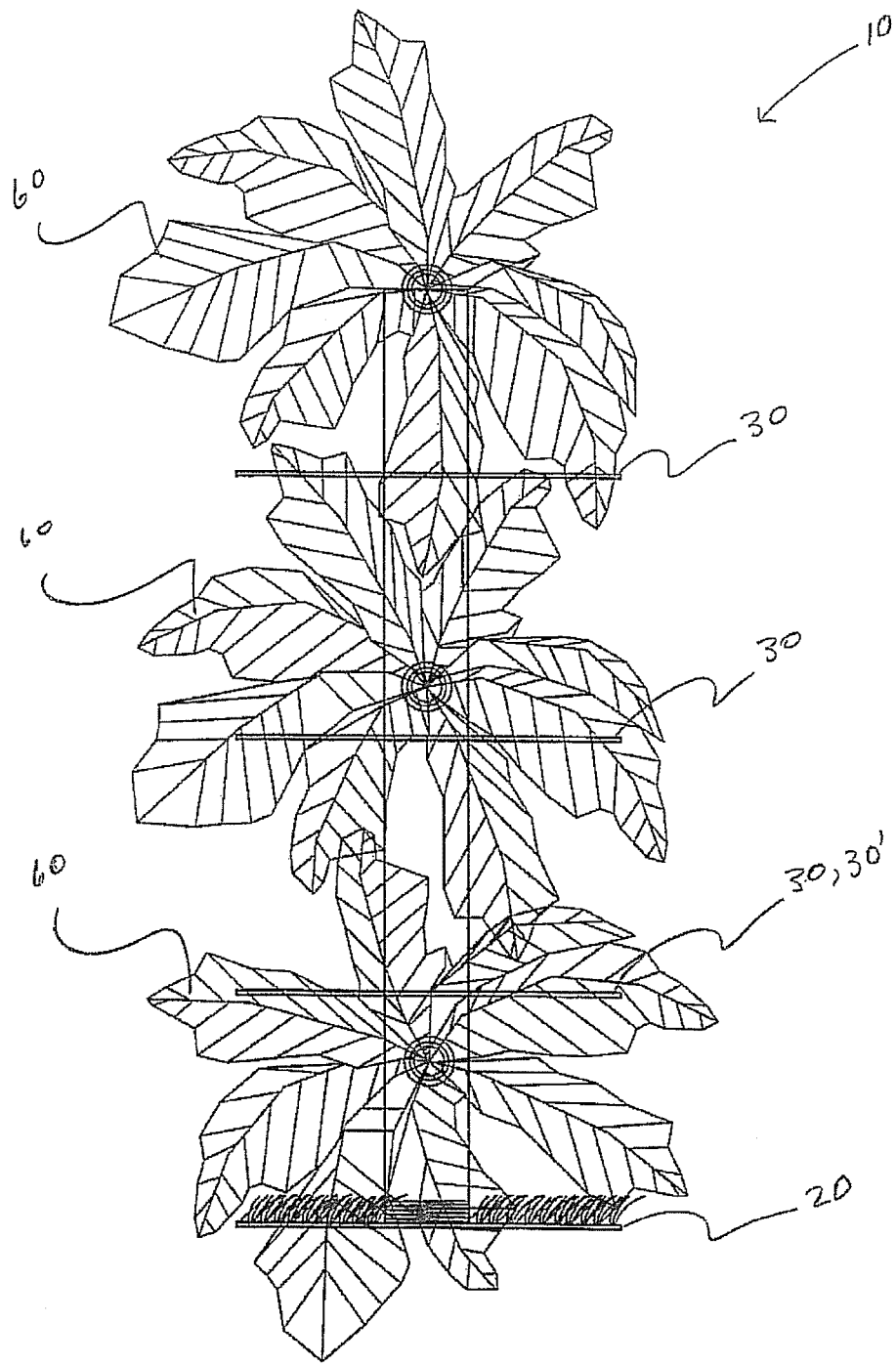
FIG. 1 is a front elevation view of at least one embodiment of the cat station as disclosed herein.

As shown in the accompanying figures, and with particular reference to FIG. 1, the present invention is directed to a modular cat station, generally referenced at 10. In particular, the cat station 10 comprises a base 20 and a plurality of spaced apart platforms 30 disposed a different heights relative to the base 20. In particular, the base 20 generally comprises a at least partially rigid structure disposable in a supporting relation with a supporting surface, such as, for example, a floor, ledge, etc. Accordingly, in a preferred embodiment, the base 20 comprises a substantially flat undersurface and is constructed of any suitable and/or rigid material, including, but not limited to, wood, plastic, aluminum, metal, etc. The undersurface of the base 20, may in at least one embodiment, comprise height adjustable feet or legs structured to facilitate adjustment of the base 20 to be level in the event the supporting surface or floor is not level. Of course, the feet or legs may also allow the base 20 to be disposed slightly above the supporting surface, if desired.

Furthermore, in at least one embodiment, as illustrated in FIG. 1, the various platforms 30 are disposed in a substantially vertically aligned orientation. This minimizes the floor space and/or footprint occupied by the cat station 10 while allowing a substantial vertical height for different levels and platforms 30.

Figure 2A:
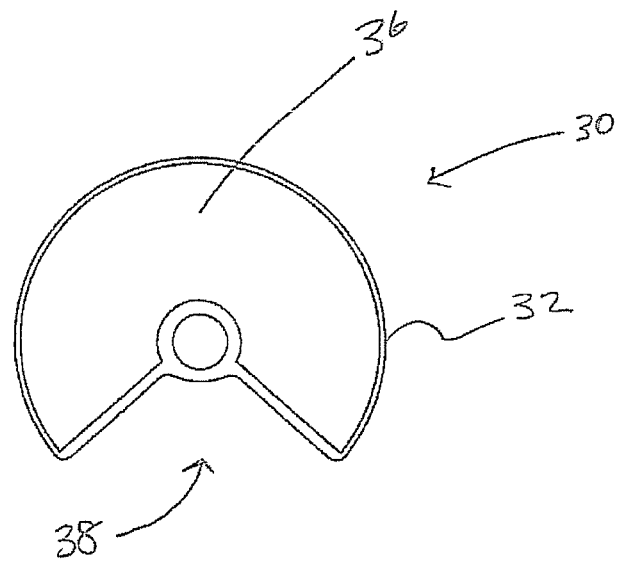
FIG. 2A is a top view of an assembled platform as disclosed in accordance with at least one embodiment of the present invention.
Figure 2B:
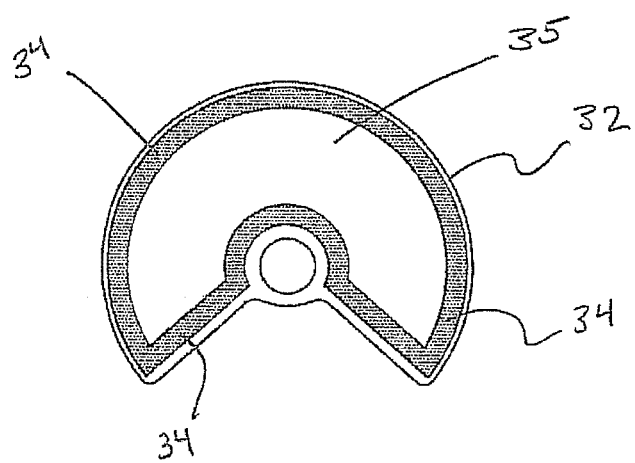
FIG. 2B is a top view of the support and intermediate padding portions of the platform illustrated in the embodiment of FIG. 2A.
Figure 2C:
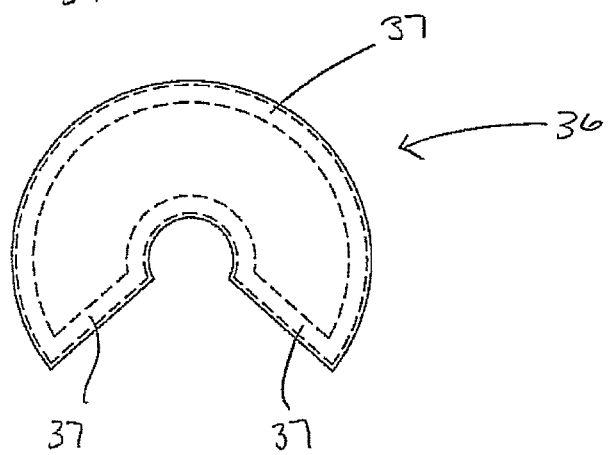
FIG. 2C is a top view of the outer exposed portion of the platform illustrated in the embodiment of FIG. 2A.

Referring now to FIGS. 2A through 2C, the platform(s) 30 of at least one embodiment comprises a layered configuration having a bottom support 32, an intermediate padding 35, and an outer exposed portion 36. In particular, the bottom support layer 32 comprises a substantially rigid and sturdy configuration and may be made of wood, plastic, and/or other materials cooperatively structured to facilitate the practice of the present invention in the intended manner. The intermediate padding 35 and outer exposed portion 36 are structured to allow the cat to scratch the platform 30 without damaging the support layer 32. Accordingly, the intermediate layer 35 may comprises foam, carpet padding, etc., whereas the outer exposed portion 36 comprises carpet, sisal rope, or other surfaces configured for cat scratching.

In addition, the outer exposed portion or layer 36 of at least one embodiment is capable of being removed and replaced, for instance, in the event the cat scratches the layer excessively and/or the layer needs to be replaced or washed. In such an embodiment, the outer exposed portion 36 and the bottom support layer 32 each comprise cooperatively structured connectors 34, 37 capable of facilitating the removal and/or replacement of the outer exposed portion 36. The connectors 34, 37 as illustrated in FIGS. 2B and 2C are representative of hook and loop type fasteners, however, any sufficient connectors or fasteners are contemplated, including, but not limited to a collection of spaced apart snaps, hooks, ties, buttons, etc. In other embodiments, the outer exposed portion 36 may be securely or fixedly attached to the support layer 32, for example, via staples, nails, screws, etc.

Furthermore, the cat station 10 of at least one embodiment comprises a passageway 38 structured and disposed to facilitate an animal, such as a feline, to maneuver between two successively disposed platforms 30. For instance, because of the vertical disposition of the various platforms 30, it may be difficult for a cat or other animal to maneuver, jump or otherwise transfer in an ascending or descending manner from one platform to another. Accordingly, the cat station 10 of at least one embodiment is structured to incorporate one or more passageways 38. Specifically, in at least one embodiment, as generally illustrated in FIG. 2A, the passageway(s) 38 may be structured in the form of at least one outer-edge or peripheral opening or notch, including, but certainly not limited to a wedge-shaped slot disposed at an outer peripheral portion of the platform 30. In certain embodiments, and with particular reference to FIGS. 17-19, at least one of the platforms comprises a generally flat, at least partially rounded structure with an outer notch 38 to form an at least partially C-shaped configuration. The opening, passageway or outer notch 38 allows the cat to easily jump or otherwise maneuver between adjacently stacked platforms 30 by passing at least partially through the passageway 38 on the uppermost platform 30 of the two adjacent or successive platforms. For instance, in the embodiment wherein the platforms are disposed in a substantially vertically aligned orientation (as illustrated in FIG. 1), the opening(s) 38 allow the cat to jump or maneuver from a lower platform 30 to an adjacent upper platform 30 more easily. As best shown in FIGS. 18 and 19, the openings or notches 38 on adjacent platforms 30 may be positioned in a staggered or non-aligned relation to one another (as opposed to in an aligned relation) in order to further facilitate jumping or maneuvering from one platform 30 to another.

Figure 3A:
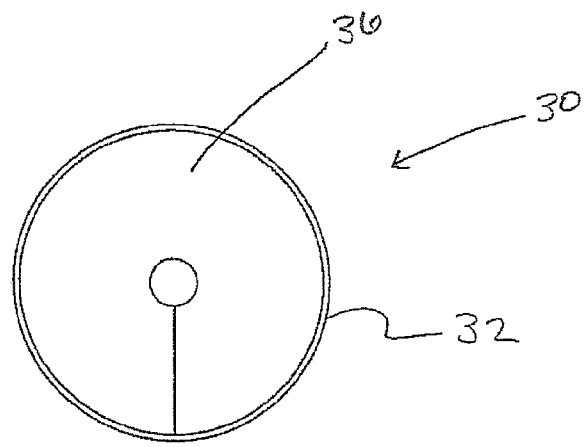
FIG. 3A is a top view of another embodiment of a platform as disclosed in accordance with the present invention.
Figure 3B:
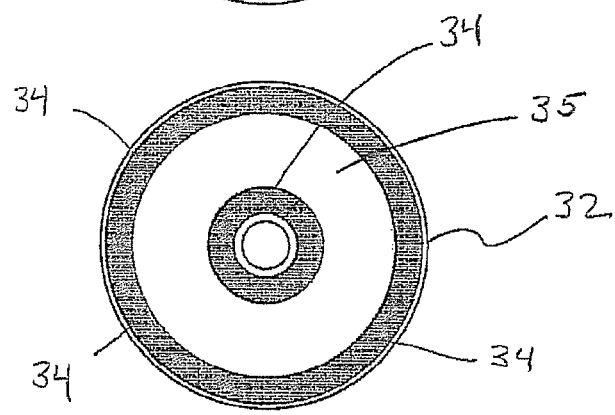
FIG. 3B is a top view of the support and intermediate padding portions of the platform illustrated in the embodiment of FIG. 3A.
Figure 3C:
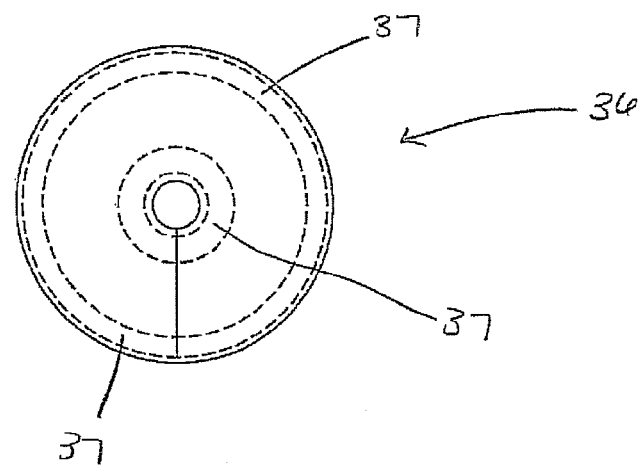
FIG. 3C is a top view of the outer exposed portion of the platform illustrated in the embodiment of FIG. 3A.

However, as shown in FIGS. 3A through 3C, in at least one embodiment, some or all of the platforms 10 may comprise a closed configuration in that there in not an outer peripheral opening or notch as described above. For instance, the platform 30 as shown in FIGS. 3A through 3C may be used as the lower most platform 30' (illustrated in FIG. 1) in that an opening 38 may not be needed depending on the height of the lower-most platform 30' nearest the base 20.

Figure 4:
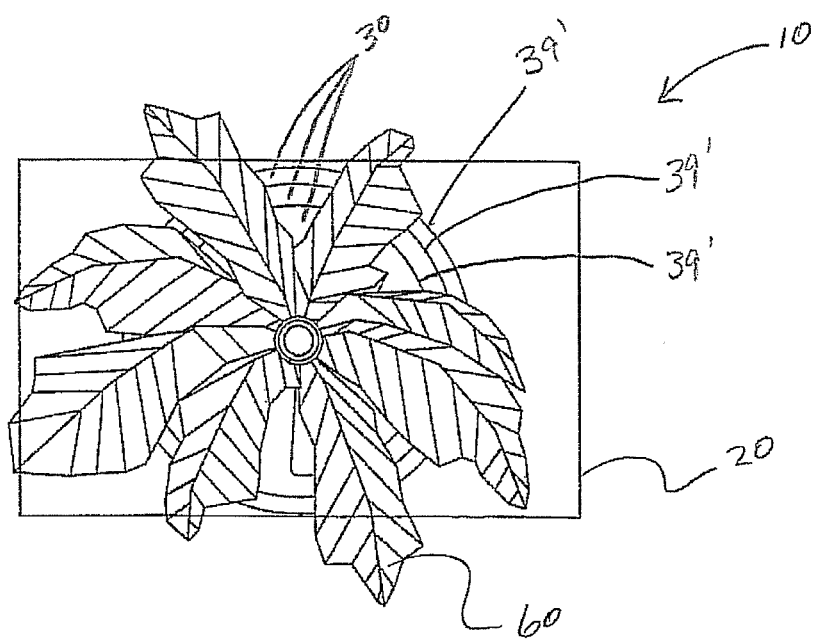
FIG. 4 is a top view of at least one embodiment of an assembled cat station as disclosed in accordance with the present invention.

Furthermore, in at least one embodiment, at least some of the adjacent platforms 30 may comprise a variable width, dimension or surface area, as generally shown in the top view of FIG. 4. For instance, the outer peripheral edges 39, 39' and 39" of the adjacent substantially vertically aligned platforms 30 form concentric rings due to the variable dimensions thereof. The variable or different surface areas of adjacent or successive platforms 30 are also structured to create a passageway, for example, via an outer peripheral notch 38, from the lower, larger platform to the upper smaller platform. This configuration and orientation further allows the cat or other animal to jump or maneuver from one platform 30 to another.

Furthermore, as described in detail herein, the various embodiments of the present invention comprise a support assembly, generally referenced as 80, structured and disposed to securely interconnect the plurality of platforms 30 and collars 40 to the base 20. Particularly, the various embodiments of the support assembly 80 allow the cat station 10 to be easily disposed between a collapsed configuration and an assembled configuration. The collapsed configuration of the cat station 10 is defined as the disassembly of various platform(s), collars(s), and/or portions of the support assembly 80 in order to facilitate shipping, storage and/or transportation. The assembled configuration (as shown in exemplary FIG. 1) is defined as the interconnection of the platform(s) 30, collar(s) 40 and base 20 via the support assembly 80.

Figure 5:
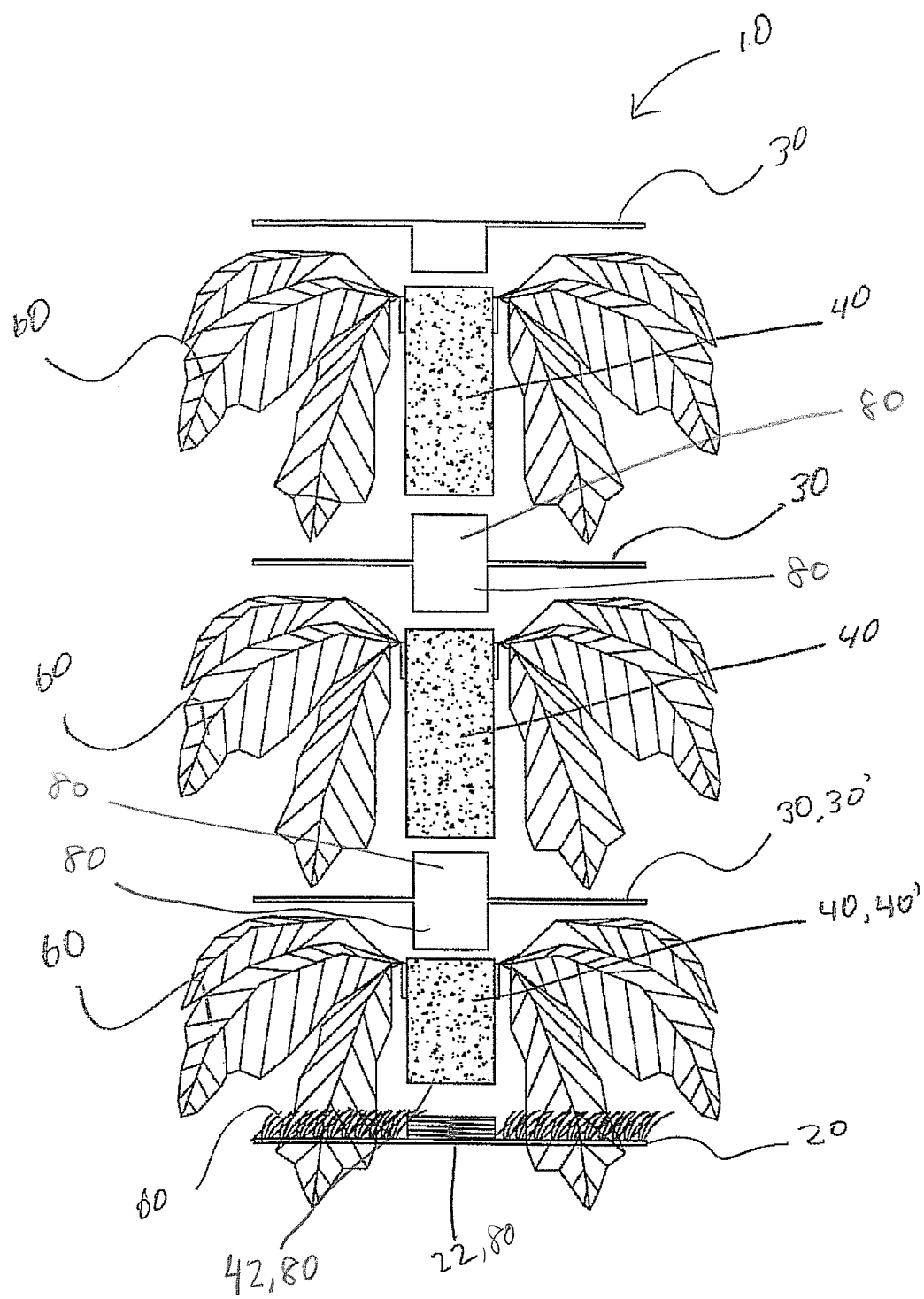
FIG. 5 is an exploded elevation view of at least one embodiment of the cat station of the present invention.

Referring now to the embodiment illustrated in FIG. 5, the support assembly may comprise a base connector 22 disposed or connected to the base 20. In particular, the base connector 22 of such an embodiment is removably connected to a first or lower collar 40'. For instance, as shown, the base connector 22 comprises a threaded body cooperatively structured and removably connected to a bottom or lower end 42 of an adjacently connected collar 40'. For exemplary purposes only, the collar 40 may be constructed of plastic, PVC, polyurethane, foam, etc. The bottom end 42 in such an embodiment comprises a cooperatively structured threaded component disposed on an interior thereof. Other connectors 22 are also contemplated, including, but in no way limited to hooks, bolts, screws, pins, etc. As will be described in greater detail below, successive cooperatively structured platforms 30 and collars 40 are telescopically connected to one another in a substantially vertically aligned manner via other portions of the support assembly 80, including telescopically connected members 31, 42, 44. In this manner, one or more of the platforms 30 may also be rotatable and/or otherwise twisted or turned into the desired position. Specifically, the platforms 30 and the collars 40 form a substantially tight interconnection that may require manual force to rotate the platforms 30 in order to avoid unintended rotation by the animal during use.

Figure 6:
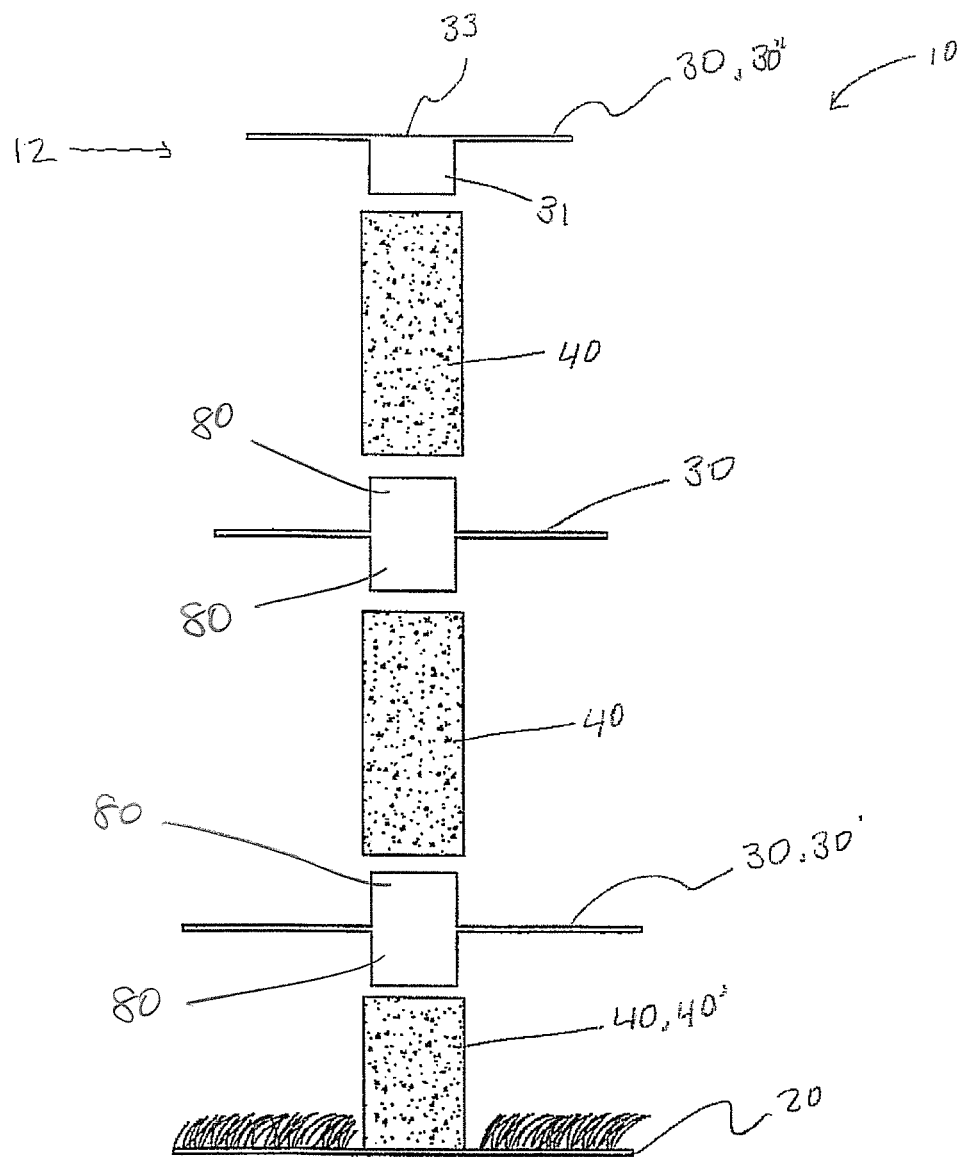
FIG. 6 is an exploded elevation view of another embodiment of the cat station of the present invention.

In another embodiment, as illustrated in FIG. 6, the bottom or first collar 40' is fixedly connected to the base 20. Again, an adjacent platform 30 is removably connected, for instance, in a telescopic manner thereto. In particular, as illustrated, in such an embodiment, the support assembly 80 comprises cooperatively structured telescopic members disposed on adjacent ends of the connected platform 30 and collar 40. Accordingly, the platform(s) and collar(s) are easily assembled and/or disassembled as needed. In yet another embodiment (not illustrated), the first, lower-most collar 40' and first, lower-most platform 30' may be fixedly connected to one another and to the base 20. In such a case, each successive collar 40 and platform 30 are thereafter disposed in a removable telescopic manner as shown in the figures and as just described. Again, the platforms 30 may, in some embodiments, be rotatable or twisted into a desired position.

Figures 7, 8:
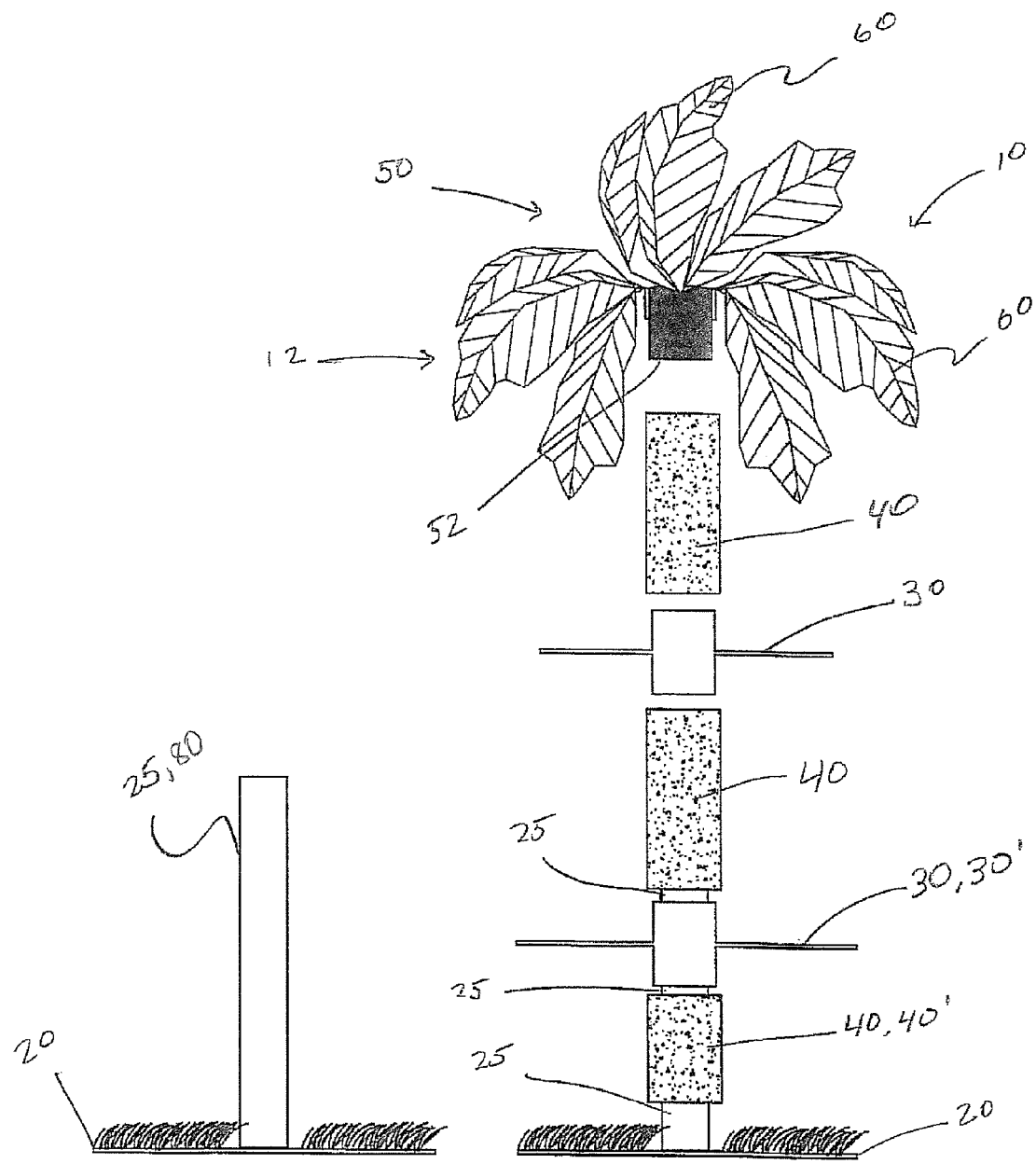
FIG. 7 is an elevation view of the base of yet another embodiment as disclosed herein.
FIG. 8 is an exploded elevation view of at least one embodiment utilizing the base illustrated in FIG. 7.

Referring now to FIGS. 7 and 8, in yet another embodiment, the support assembly 80 further comprises an internal support column 25 connected, either fixedly or removably, to the base 20. In such an embodiment, at least some of the platforms 30 and collars 40 comprise an internal hollow channel or cavity cooperatively structured and disposed to operatively fit around or otherwise be disposed in a covering relation to the support column 25. The support column creates a substantial amount of support and sturdiness to the cat station 10 and minimizes accidental collapse or destruction thereto.

Figure 9:
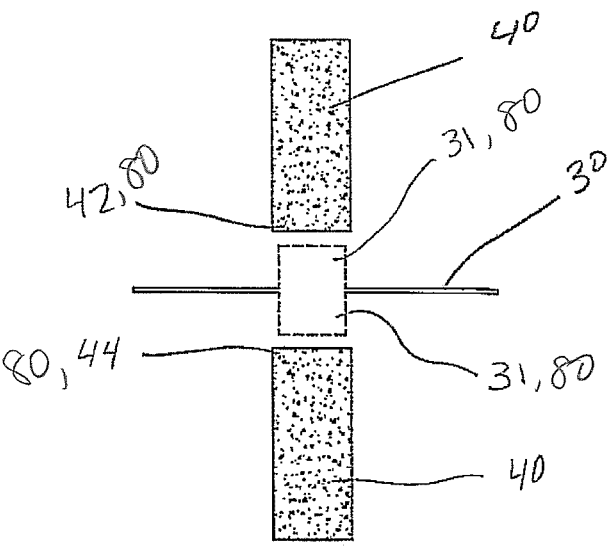
FIG. 9 is an exploded elevation view of a platform and adjacent collars.
Figure 10:
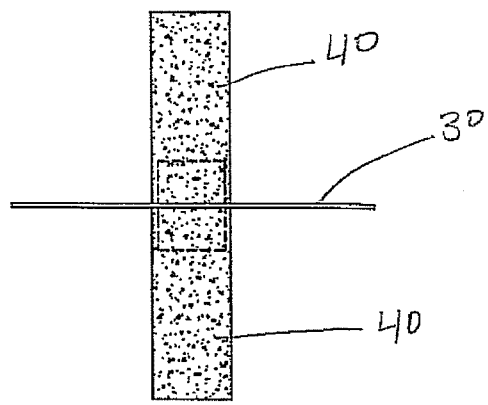
FIG. 10 is an elevation view of the platform and adjacent collars illustrated in FIG. 9.

As best illustrated in FIGS. 9 and 10, each of the platforms 30 of at least one embodiment of the present invention is connected in a telescopic manner to an adjacent collar 40. For instance, the platform 30 of the embodiment shown in FIGS. 9 and 10 comprise an extending support portion 31 cooperatively structured to connected to or be disposed within an adjacent end 42, 44 of the corresponding collar 40. As described above, in at least one embodiment the platforms 30 and corresponding collars 40 form a tight, yet manually rotatable connection, sufficient to allow a user to rotate or twist the platform(s) 30 into a desired position, however, tight enough to eliminate or minimize unintended rotation by the cat or animal.

Figure 11:
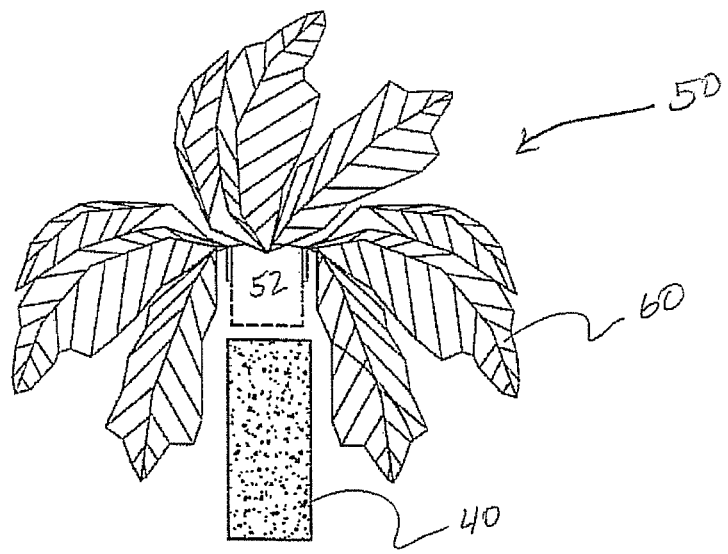
FIGS. 11 and 12 are exploded elevation view of an upper cap and different camouflaging elements as disclosed in accordance with the present invention.
Figure 12:
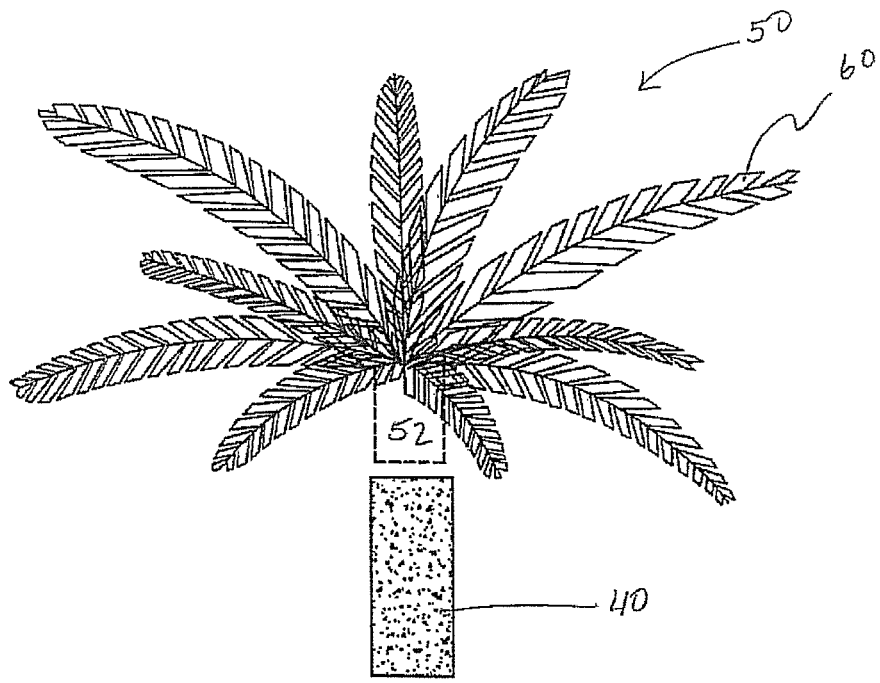
Figure 13:
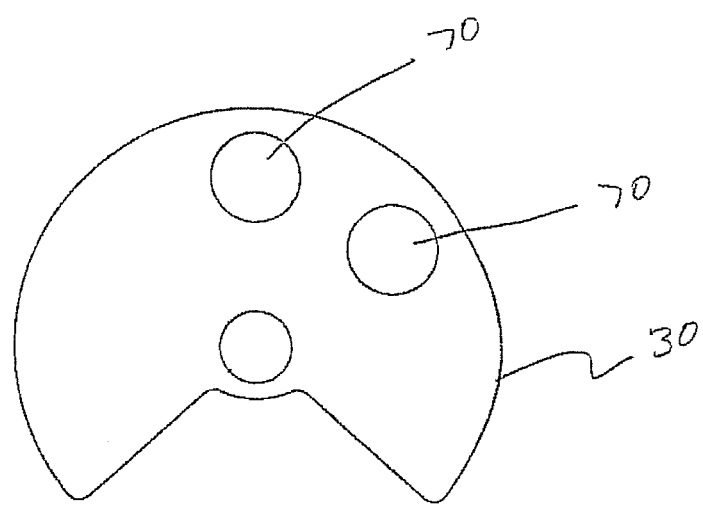
FIG. 13 is a top view of a platform with integrated accessory zones disposed thereon.
Figure 14:
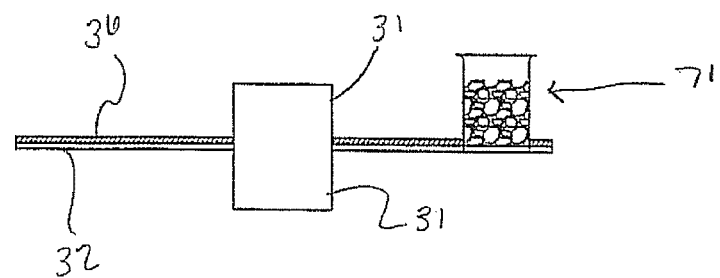
FIGS. 14 and 15 are side elevation views of a platform with a container disposed in an integrated accessory zone.
Figure 15:
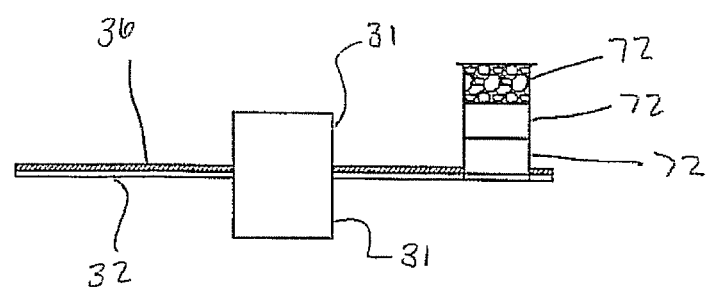
Figure 16:
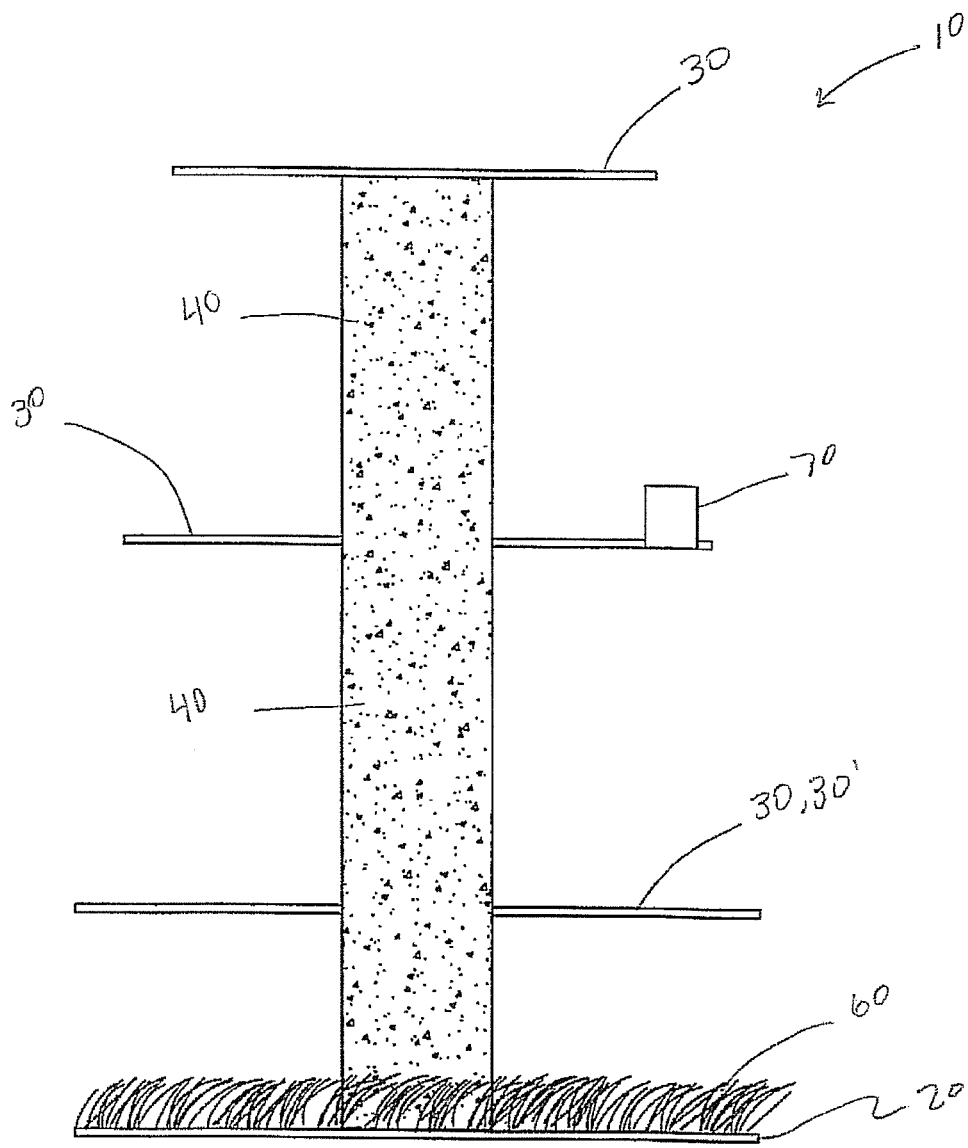
FIG. 16 is an elevation view of at least one embodiment of the cat station as disclosed herein.

The upper most end 12 of the cat station 10 of the present invention may comprise a platform 30" (shown in FIG. 6) with one lower extending support portion 31 and, in at least one embodiment, a substantially flat upper surface 33. However, the upper most end 12 of the cat station 10 may instead be customized with an upper cap 50 (as shown in FIGS. 8, 11 and 12) connected to an adjacent collar 40 and/or platform 30. Accordingly, the upper cap 50 of at least one embodiment comprises an extending support portion 52 telescopically connected to the adjacent collar 40 or platform 30. The upper cap 50 may comprise a plurality of camouflaging elements 60, as discussed below.

Moreover, one or more of the platforms 30 comprises at least one, but more practically, two or more accessory zones 70 embedded or otherwise constructed thereon. For instance, the accessory zone 70 of at least one embodiment comprises an indented area cooperatively structured to receive an accessory such as a container, food and/or water bowls, etc. In particular, the indented area of the accessory zone 70 serves to minimize spilling or movement of the food and water bowl 71 while the cat is eating or drinking therefrom, or otherwise passing by.

Additionally, the food and/or water bowls 71 of at least one embodiment comprises a plurality of stackable and removably connected sections 72 in order to adjust the height of the corresponding bowl 71. For instance, as the cat grows and gets larger, it is generally healthier and safer for the cat to eat and drink out of elevated bowls. Accordingly, the variable height bowl 71 comprising a plurality of stackable sections 72 allows the owner to adjust the height at which the cat eats and drinks to correspond with the size of the cat as the cat grows older and larger. In addition, for households with multiple cats, it is often desirable to make sure kittens or younger cats eat their designated food rather than eating the same food as the adult cats. Accordingly, the owner can adjust the height of the adult cat's bowl to exceed the height in which the kittens can reach thereby not allowing the kittens to eat the adult cat food.

Figure 17:
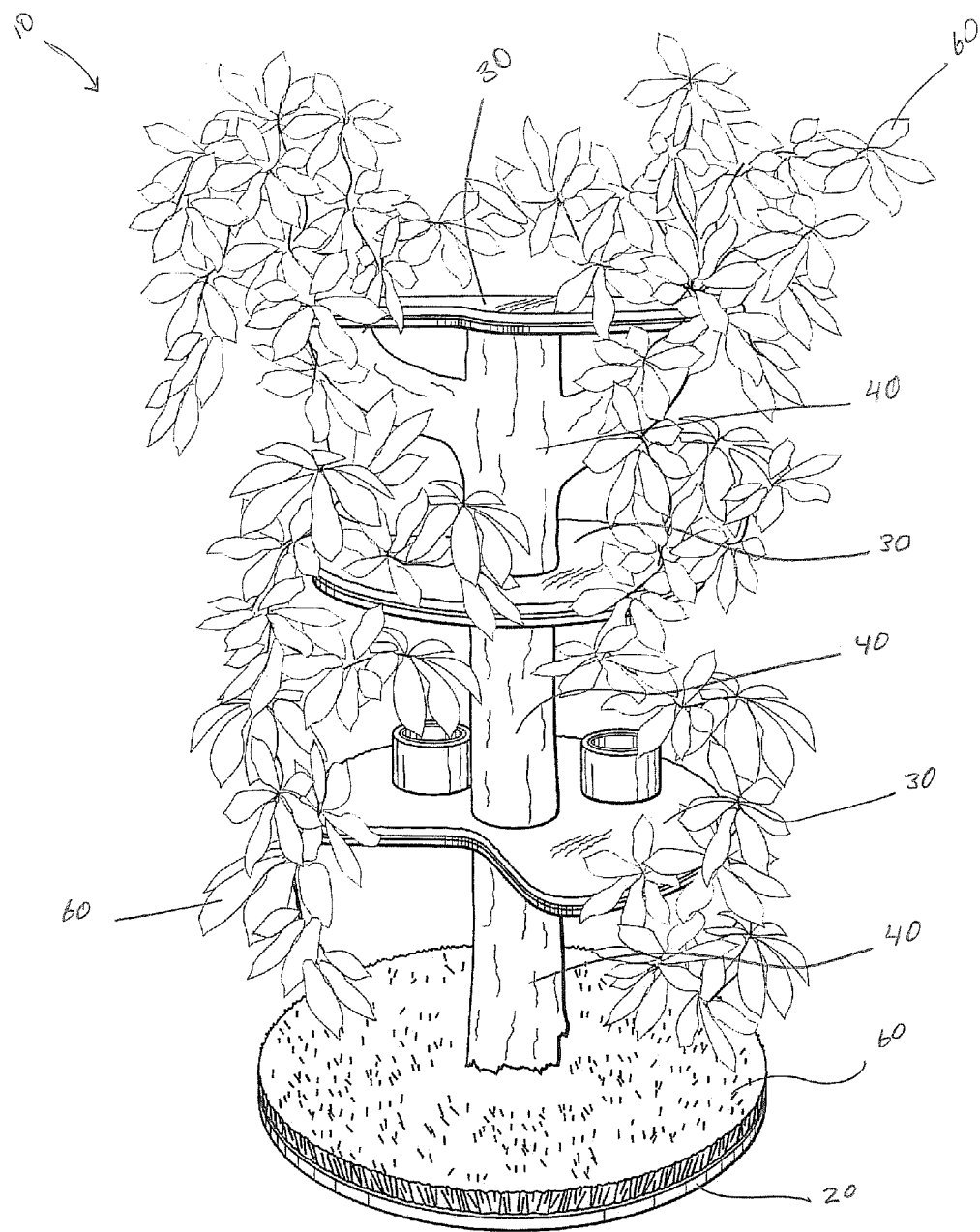
FIG. 17 is a front perspective view of yet another embodiment of the cat station as disclosed herein.
Figure 18:
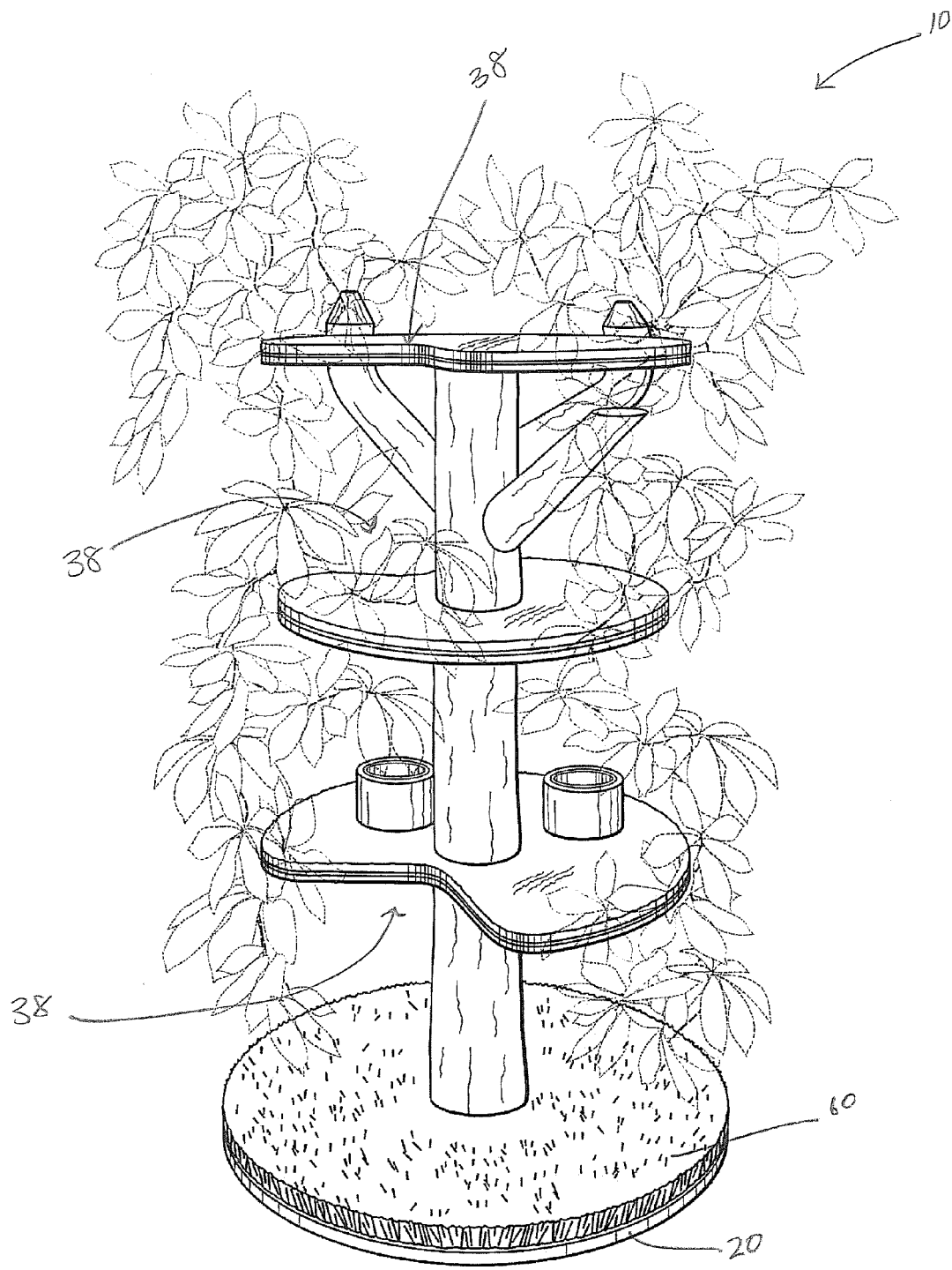
FIG. 18 is a front perspective view of the cat station illustrated in FIG. 17 with the various auxiliary components provided in phantom.
Figure 19:
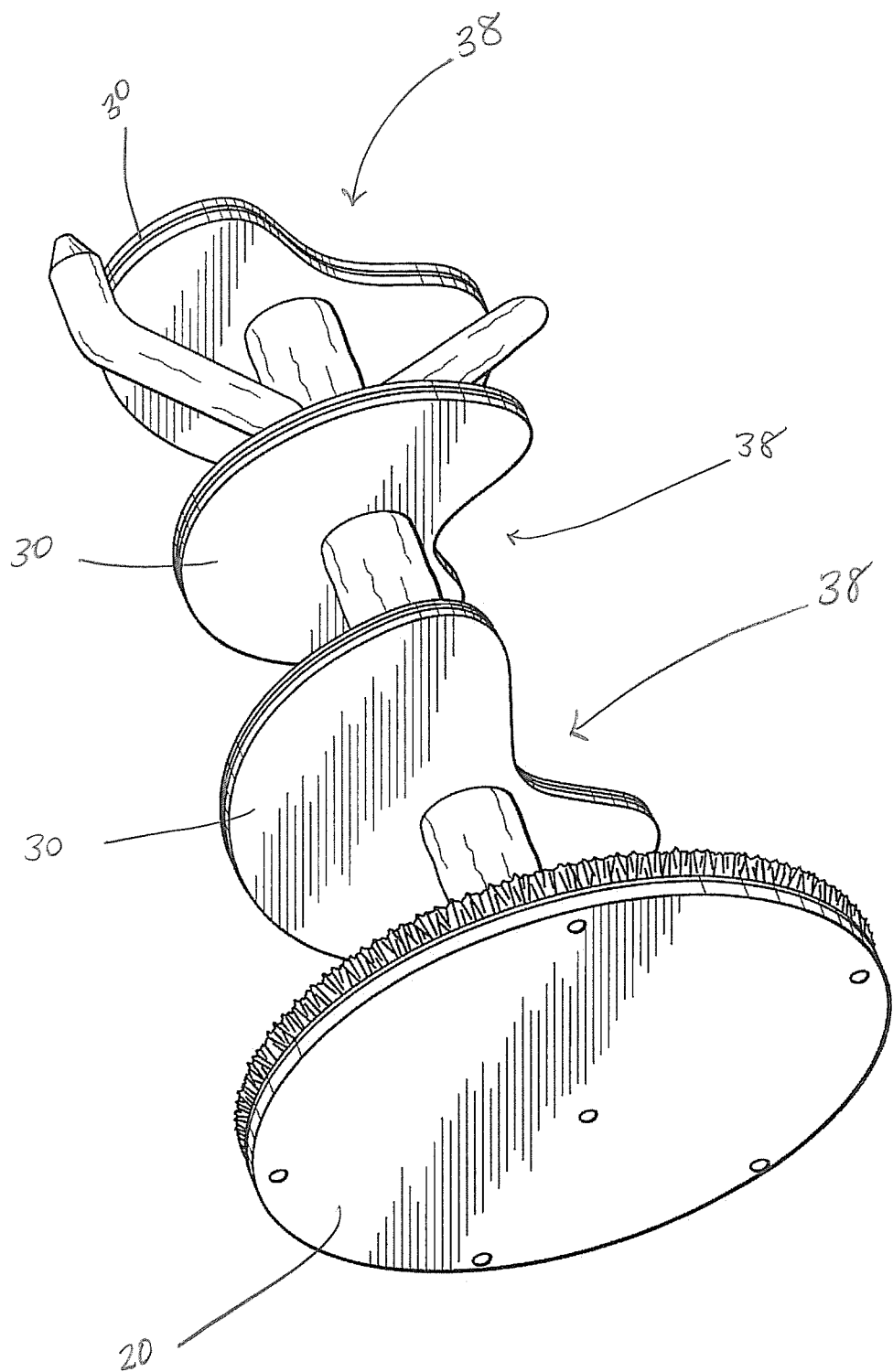
FIG. 19 is bottom perspective view of the embodiment illustrated in FIGS. 17 and 18, without the auxiliary components installed.

Furthermore, as best illustrated in FIGS. 1, 17 and 18, at least one embodiment of the present invention further comprises a plurality of camouflaging or auxiliary elements 60 and/or other components structured and disposed to resemble plant-life and/or one or more components of a plant, tree, bush, branch, leaf, grass, flower or other foliage. The camouflaging or auxiliary elements 60 may be removably or fixedly connected to various portions of the cat station 10, such as, for instance, along one or more sections of the collar(s) 40, on the base 20, at the upper most end 12, and/or on one or more of the platform(s) 30. Specifically, the elements 60 may be fixedly secured to the cat station 10, for instance by virtue of staples, nails, screws, etc., and/or removably connected via any one or more fasters, including, but certainly not limited to hook and loop type fasteners such as VELCRO, snaps, hooks, adhesive, magnets etc. The various camouflaging elements 60 are constructed of a material safe for cats and other animals as it is not uncommon for the cat to play with the elements 60 while utilizing the cat station 10 of the preset invention.

Furthermore, the various camouflaging elements 60 of the present invention serve to conceal one or more portions of the cat station 10 thereby creating an aesthetically pleasing structure that can be added to almost any home. When fully constructed and assembles, the cat station 10 of the present invention is designed to have the appearance of a tree, bush, or other plant.

As another structural variation, at least one embodiment of the present invention comprises a stabilizing assembly (not shown) connected between the cat station 10, for instance to one or more collars 40 and/or platforms 30, and an adjacent structure, such as a wall or other stable construction. For exemplary purposes only, the stabilizing assembly may comprise one or more cooperatively structured hooks and fasteners, each fastener being connected to an adjacent wall with a molly, if necessary. Of course other structural variation to the stabilizing assembly are contemplated, including, but not limited to string, rope, or other ties connected to or around the cat station 10 and an adjacent structure, such as the wall or floor. As can be appreciated, the stabilizing assembly is structured to provide additional support to the cat station 10 in order to eliminate accidental or unintended collapse thereof.

Figure 20:
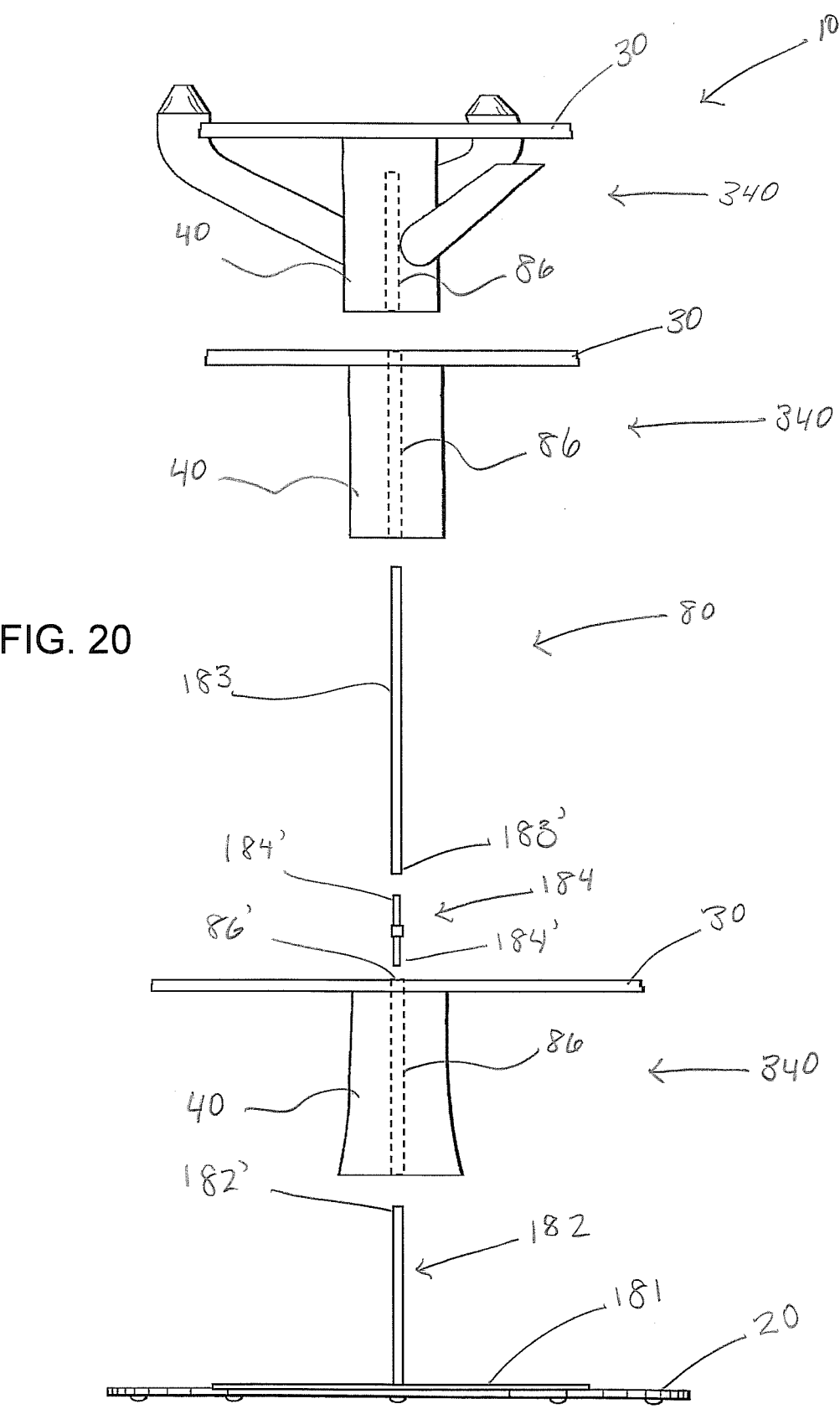
FIG. 20 is an exploded view of yet another embodiment of the support assembly as disclosed in accordance with the present invention.
Figure 21:
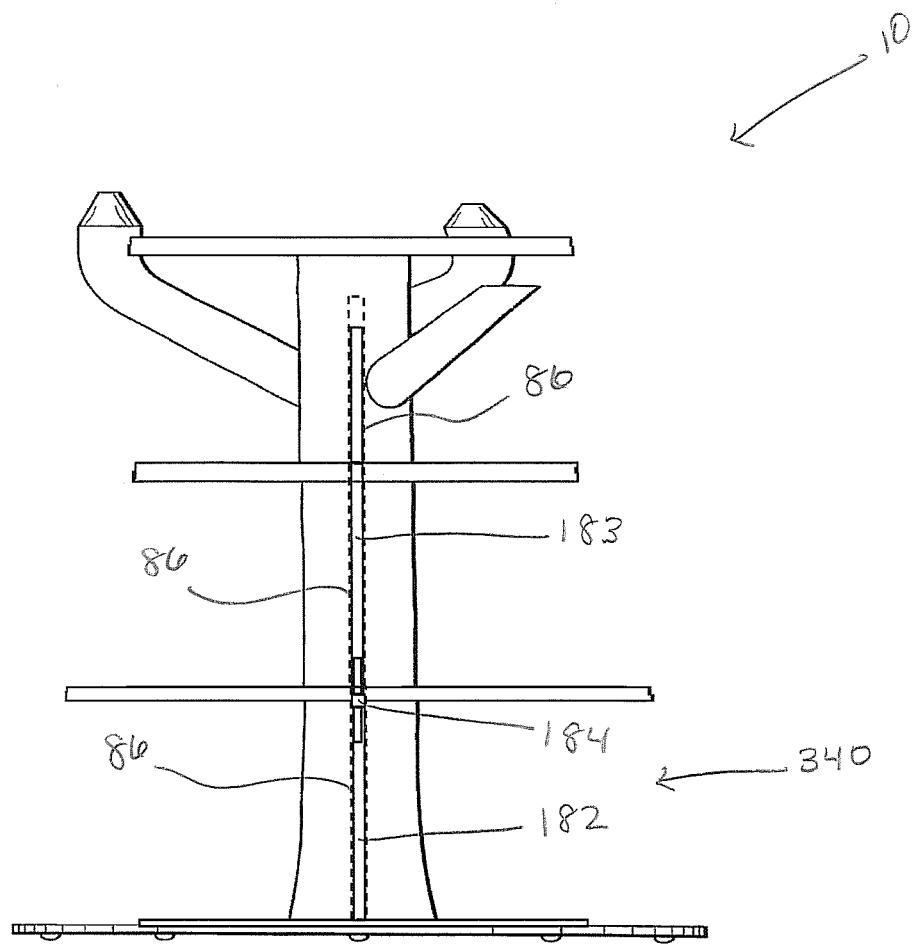
FIG. 21 is a front elevation view of the assembled cat station illustrated in FIG. 20.
Figure 22:
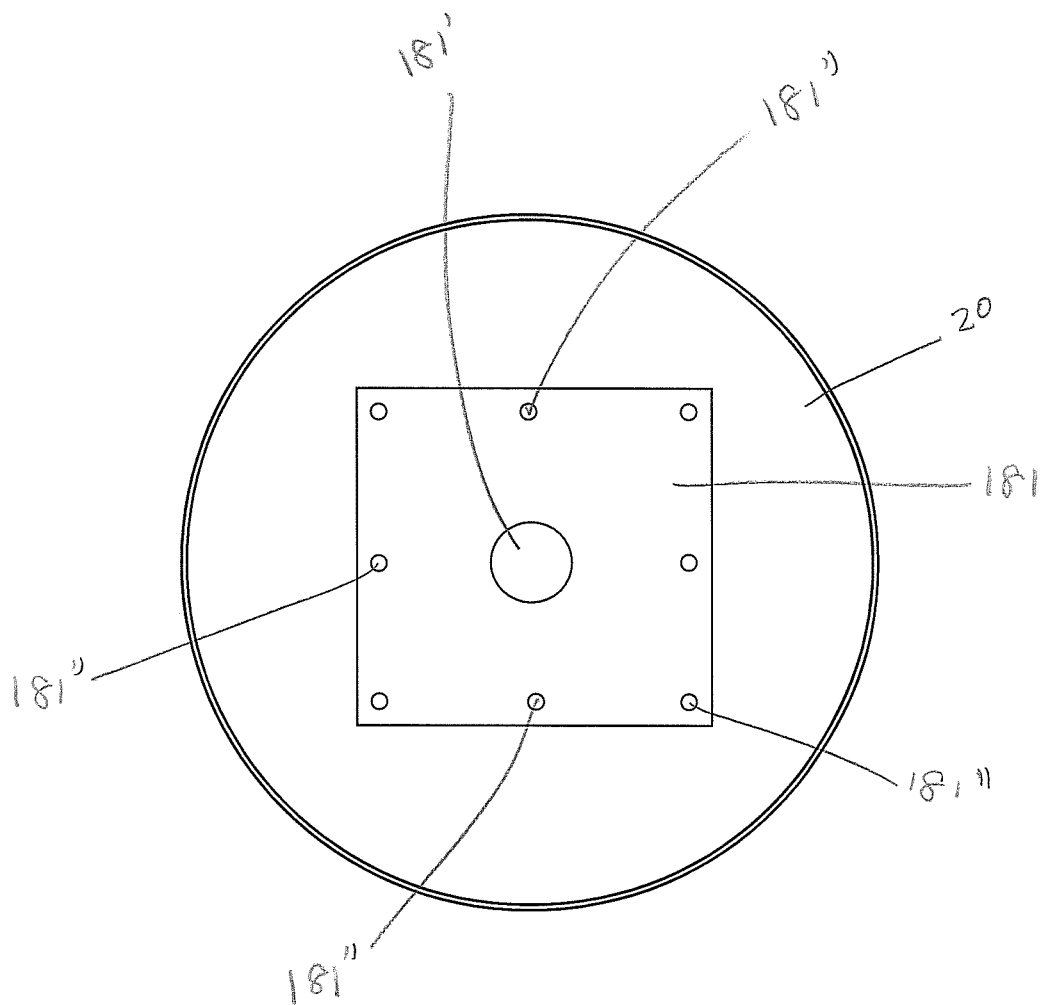
FIG. 22 is a top view of at least one embodiment of the base and base plate.

FIGS. 20 and 21 illustrate yet another structural variation of the support assembly 80 of at least one embodiment of the present invention. In particular, the support assembly 80 of such an embodiment comprises at least one outwardly extending support shaft 182 operatively interconnected to the base 20. As illustrated in FIGS. 20 and 21, the shaft 182 is fixedly secured to a base plate 181 which is, in turn, fixedly secured to the base 20. For instance, as generally illustrated in the top view of the base 20 (shown in FIG. 22), the base plate 181 is secured to the base 20 via a number of spaced apart fasteners 181", such as screws, bolts, etc. The auxiliary element(s) (not shown), such as faux grass or other elements replicating plant-life, are then disposed on top of the base plate 181 to camouflage or conceal the base plate 181 thereunder. It should be noted, however, that the shaft 182 may also or instead be removably secured to the base 20 and/or base plate 181, for instance, via fasteners, screws, latches, threaded connectors, etc.

For exemplary purposes only, the shaft 182 of at least one embodiment includes, but is certainly not limited to, mild steel tubing, galvanized steel pipe, rigid plastic, PVC, and/or any other structurally sufficient materials or components. Further, the base plate 181 of at least one embodiment may include, but is also not limited to, a steel plate, which in one embodiment comprises a 12 inch×12 inch, ¼ inch thick plate. Of course other dimensions structured to facilitate the practice of the present invention in the intended manner are suitable.

Furthermore, and referring again to FIG. 20, the support assembly 80 of at least one embodiment comprises a plurality of shaft members 182, 183 interconnected to one another and to the base 20 via an intermediary connector 184. The intermediary connector 184 comprises two oppositely disposed ends 184' telescopically connected to corresponding ends 182', 183' of the adjacent or connecting shaft members 182, 183.

In addition, as illustrated in FIG. 20, the plurality of platform-collar pairs 340 (comprising a platform 30 and a corresponding collar 40) include an internal channel or cavity 86 disposed at least partially therethrough. The platform and collar of a single platform-collar pair 340 may be fixedly secured to one another, molded together as a single construction, and/or separate, removable components. Further, the internal cavities or channels 86 are structured and disposed to removably receive the shaft 182, 183 therein in order to dispose the cat station 10 from a collapsed or disassembled configuration (as generally illustrated in the exploded view of FIG. 20) to an assembled configuration (as illustrated in FIG. 21).

Figure 23A:
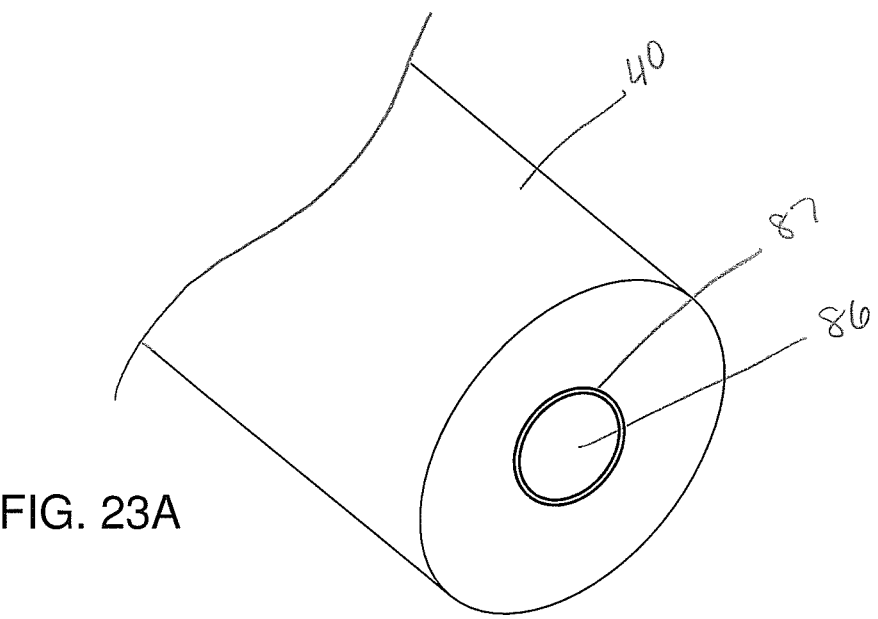
FIG. 23A is a bottom perspective view of at least one collar as disclosed in accordance with at least one embodiment of the present invention.
Figure 23B:
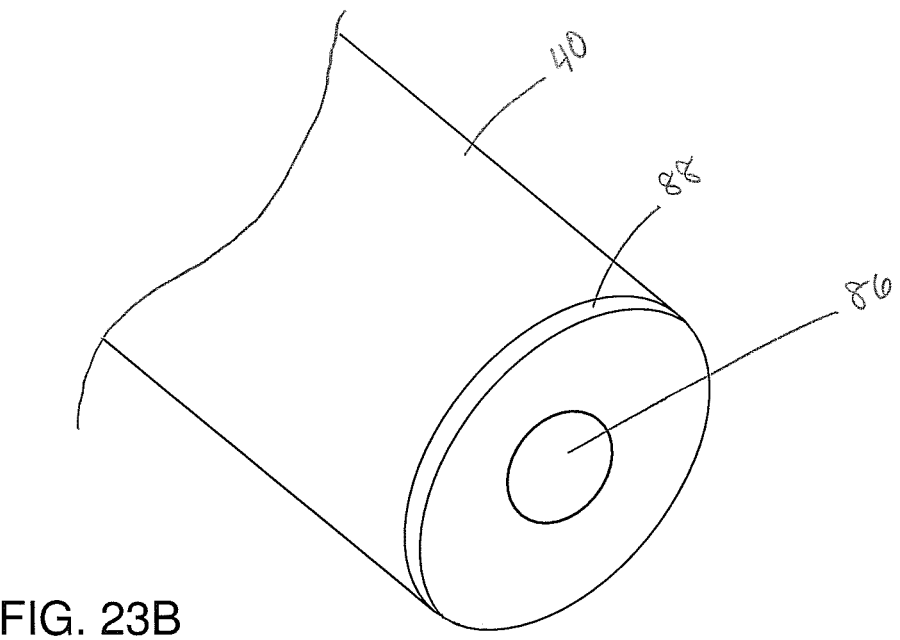
FIG. 23B is a bottom perspective view of another collar as disclosed herein.

Furthermore, the internal cavities or channels 86 of at least one embodiment each comprises a rigid reinforcement disposed on a peripheral edge therein, as generally illustrated in FIG. 23A. In particular, the internal cavities 86 may comprise mild steel tubing, pole, pipe or other rigid structural reinforcement 87 on the inside thereof in order to provide added rigidity and stability to the assembled cat station. For exemplary purposes only, the reinforcement 87 of at least one embodiment comprises a steel pole having a one and a quarter inch diameter. Moreover, the collars 40 (and potentially the platforms 30 as well) of at least one embodiment may comprise or be constructed of a polyurethane foam mold or other like structure or component. Accordingly, the rigid reinforcement 87 disposed on the interior of the cavities 86 are operatively structured to provide maximum stability to the cat station while assembled and used in its intended fashion. In yet another embodiment, however, as shown in FIG. 23B, the collar 40 may instead or in addition to the reinforcement, comprise a rigid cap 88 disposed on an end thereof. The cap 88 comprises an internal aperture or hole cooperatively aligned with the internal cavity 86 and is structured to provide added stability and rigidity to the assembled station 10. In particular, the internal hole or cavity of cap 88 is dimensioned to correspond with or otherwise receive shaft 182, 183 as described herein. Accordingly, the cap 88, in at least one embodiment, comprises wood, plastic, or other substantially rigid material or construction.

Referring again to FIG. 21, the cat station 10 as illustrated is disposed in the assembled configuration. Specifically, the first or bottom shaft 182 is disposed through or within the internal cavity 86 of the first or bottom platform-collar pair 340. Once in place, the intermediary connector 184 is disposed within the upper cavity aperture 86' of the lower platform-collar pair 340 and in telescoping relation with the first or lower shaft 182. Once the intermediary connector 184 is in place it protrudes slightly out of or otherwise extends beyond the upper cavity aperture 86', allowing the user to telescopically dispose the second shaft member 183 thereon. Once the second shaft member 183 is in place, the remaining platforms 30, collars 40 and/or platform-collar pairs 340 may slide or stack into place, as illustrated. In such an embodiment, the platform(s) 30, collar(s) 40 and/or platform-collar pair(s) 340 may rotate, for example, around the internal support assembly 80 such that a user mat position or rotate the various components into a desired orientation.

Figure 24:
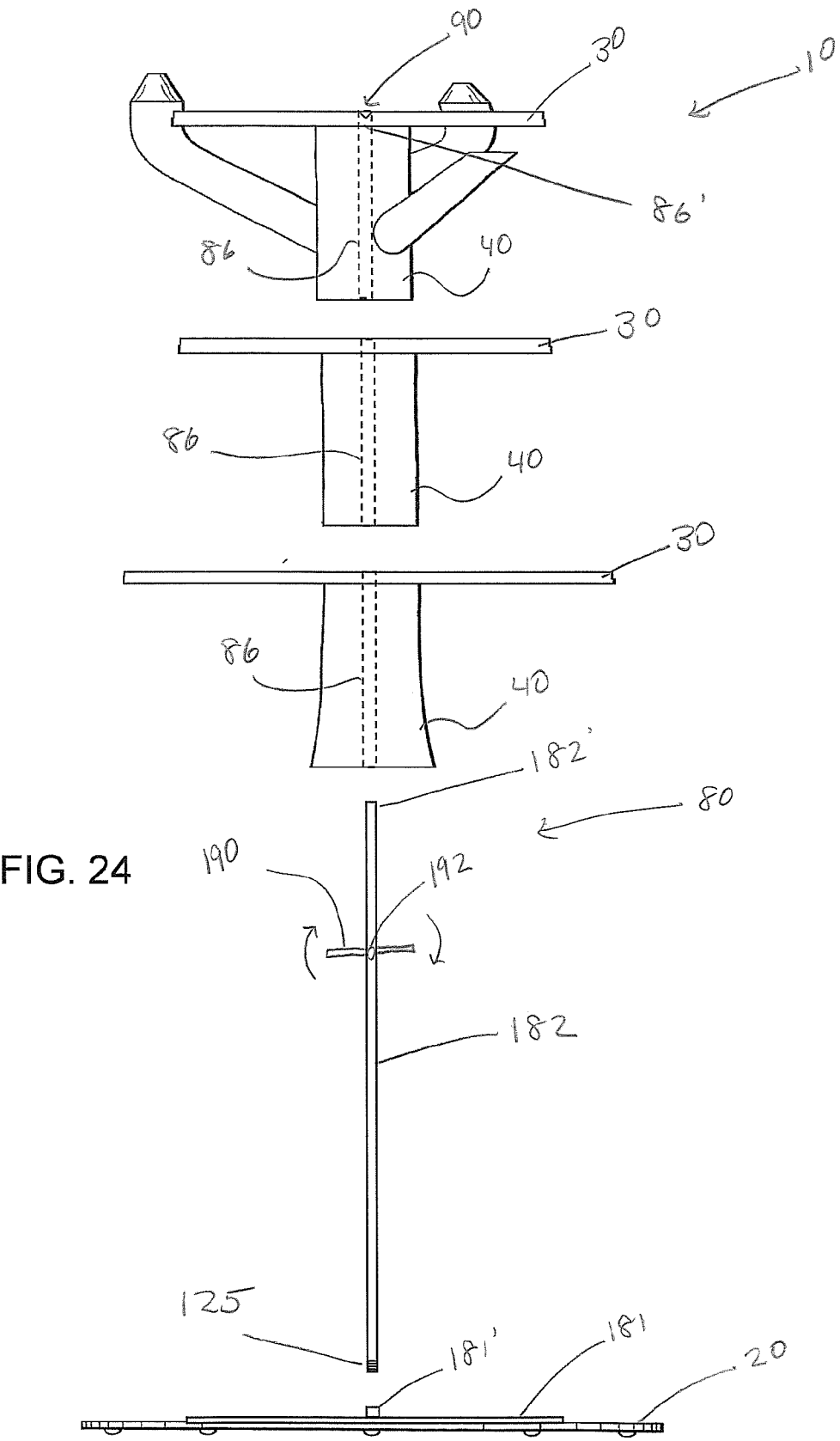
FIG. 24 is an exploded view of another embodiment of the support assembly of the present invention.
Figure 25:
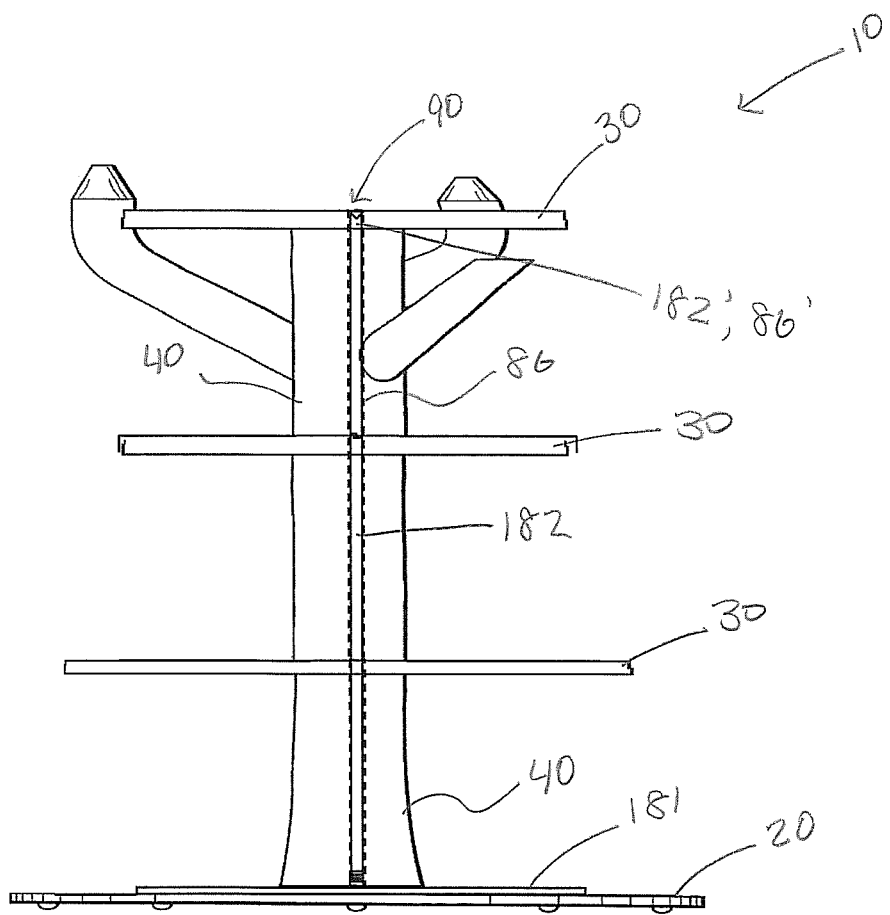
FIG. 25 is a front elevation view of the assembled cat station illustrated in FIG. 24.

Yet another structural variation of the cat station 10, and in particular, the support assembly 80, is illustrated in FIGS. 24 and 25. In particular, the support assembly 80 of at least one embodiment comprises a single or unitary support shaft 182 comprising a sufficient length and rigidity to support a plurality of platforms 30 and a plurality of columns 40, as shown. Again, the shaft 181 may include, but is certainly not limited to, mild steel tubing, galvanized steel pipe, rigid plastic, PVC, and/or any other materials or components structured to facilitate the practice of the present invention in the intended manner.

Additionally, as illustrated in FIG. 24, the shaft 182 of at least one embodiment is removably interconnected to the base 20 and/or base plate 181. Specifically, the base plate 181 and the shaft 182 each comprise corresponding threaded connectors 181' and 125, respectively. In the embodiment shown, the threaded connector 125 of the shaft 182 is disposed within the corresponding threaded connector 181' disposed on the base plate 181. It is contemplated, however, that virtually any secure interconnection can be implemented, including the use of one or more pins, notches, locks, etc. in order to facilitate the practice of the present invention in the intended manner.

Furthermore, at least one embodiment comprises a leverage tool 190 disposed in an engaging relation with the elongated shaft 182. Specifically, the leverage tool 190 is structured to facilitate the manual disposition of the shaft 182 into and out of a tight engaging relation with the base 20 and/or base plate 181. For example, the leverage tool 190 of at least one embodiment comprises at least one, but more practically, two oppositely disposed handles engaged by a user's hands and structured to facilitate the manual rotational movement or twisting of the shaft 182 to ensure a tight, secure engagement between the shaft 182 and the base 20 or base plate 181. For instance, the leverage tool 190 of at least one embodiment comprises a bar removably disposable into a corresponding aperture 192 located on and disposed through the shaft 182. Accordingly, in operation, a user will position the shaft 182 into the connector 181' and position the leverage tool 192 into an engaging relation with the shaft 182 by virtue of disposing the tool 190 through aperture 192. The user will then apply manual rotational force to the shaft 182 by virtue of rotating the tool 190. Once the shaft 182 is secured into place, the user may remove the tool 190 and proceed with the assembly of the cat station 10 as described herein. In other embodiments, however, the leverage tool 192 may be fixedly attached to the shaft 182 and disposable between an operative position (wherein a user may rotate the tool and apply force to the shaft 182) and a collapsed or non-operative position (e.g., telescopically closed or collapsed, pivoted up or down, etc.)

Once the shaft 182 is secured in place, as described above, the various collars 40 and platforms 30 (and/or platform-collar pairs) may be disposed or otherwise stacked upon one another. For instance, the platforms 30 and/or collars 30 comprise internal cavities 86 cooperatively structured to receive the shaft 182, as illustrated in FIGS. 24 and 25. The cat station 10 is thus easily disposable between the collapsed configuration (generally shown in the exploded view of FIG. 24) and the assembled configuration (illustrated in FIG. 25).

Additionally, in at least one embodiment, the cat station 10 comprises an end cap 90 disposed at or near the end of the top internal cavity 86'. As illustrated in FIG. 24, the end cap 90 is disposed at the outermost edge of the cat station 10, and in particular at the end of the top platform 30, however, it should be noted that the end cap 90 may be disposed within the uppermost collar 40, or otherwise at the uppermost end of the internal cavities 86. Furthermore, the end cap 90, of at least one embodiment, comprises a general conical shape or otherwise comprises a downward converging configuration. Such a configuration is structured and disposed to guide the end of the shaft 182 as the end platform 30 or collar 40 is operatively assembled. More in particular, the shaft 182 of at least one embodiment comprises a hollow interior, or at least a hollow upper end 182' which is structured to at least partially receive the conical or converging end cap 90 therein. Accordingly, as previously mentioned the end cap 90 is structured to guide the shaft 182 into place and to further facilitate the maximum stability of the assembled cat station 10. The end cap 90 is particularly important, but not expressly necessary, in the embodiment wherein the internal cavity 86 does not have a rigid reinforcement on the interior thereof. For example, in such an embodiment, the collar 40 may include a rigid bottom end cap or guide (as illustrated in FIG. 22B) to further assist in the stability and rigidity of the cat station 10.

The cat station 10 of the various embodiments disclosed herein may be easily disposed between a collapsed orientation and an assembled orientation allowing for easy transportation, storage, assembly and disassembly. In addition, it should be apparent that the various embodiments may be customized in that a user may choose to install or assemble any number of collars 40 and/or platforms 30 depending upon his or her desires or needs. For exemplary purposes only, in the embodiment illustrated in FIGS. 20-23, the user may choose to install only one platform-collar pair 340 (e.g., the upper most platform-collar pair 340 with a top end-cap). In such an instance, the cat station 10 may be customized for smaller animals or kittens and adaptable as the animal ages or grows.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

Now that the invention has been described,

What is claimed is:
1. A modular cat station, comprising:
a base disposable in a supporting relation with a supporting surface,
a plurality of platforms and a plurality of collars disposed in a removably stacked relation to said base, wherein said plurality of platforms are disposed in a substantially vertically aligned relation to one another,
said plurality of platforms comprising a substantially rigid and non-bendable configuration and support ledge, wherein at least one of said plurality of platforms comprises an outer peripheral notch structured to facilitate an animal to maneuver between two successively disposed ones of said plurality of platforms,
an internal support assembly cooperatively structured and disposed to securely interconnect said plurality of platforms and plurality of collars to said base, wherein said modular cat station is disposable between a collapsed configuration and an assembled configuration, and
a plurality of auxiliary members connected to said modular cat station and extending in an at least partially covering relation to at least a portion of said plurality of platforms and plurality of collars, said plurality of auxiliary members being structured to at least partially represent plant life.

2. The modular cat station as recited in claim 1 wherein said internal support assembly comprises at least one outwardly extending shaft connected to said base.

3. The modular cat station as recited in claim 2 wherein said at least one outwardly extending shaft comprises a steel tube.

4. The modular cat station as recited in claim 2 wherein said at least one outwardly extending shaft comprises a galvanized steel pipe.

5. The modular cat station as recited in claim 2 wherein said outwardly extending shaft comprises a single-piece construction.

6. The modular cat station as recited in claim 5 further comprising a leveraging tool disposed in an engaging relation with said shaft and structured to facilitate a manual disposition of said shaft into a tight removable engagement with said base.

7. The modular cat station as recited in claim 2 wherein said internal support assembly comprises a plurality of shaft members removably connected to an intermediary connector.

8. The modular cat station as recited in claim 2 wherein said outwardly extending shaft is removably connected to said base.

9. The modular cat station as recited in claim 2 wherein said outwardly extending shaft is fixedly attached to said base.

10. The modular cat station as recited in claim 2 further comprising a plurality of platform-collar pairs, wherein each of said plurality of platform-collar pairs comprise an internal cavity disposed at least partially therethrough, said internal cavities cooperatively structured and disposed to removably receive said shaft therein.

11. The modular cat station as recited in claim 10 wherein each of said internal cavities of said plurality of platform-collar pairs comprise a rigid reinforcement disposed on an internal peripheral edge thereof.

12. The module cat station as recited in claim 1 wherein at least two of said plurality of platforms comprise different surface areas.

13. The modular cat station as recited in claim 12 wherein said plurality of platforms are positioned in order of decreasing surface area from said base to a top of said modular cat station.

14. The modular cat station as recited in claim 1 wherein at least one of said plurality of platforms comprises an at least partially C-shaped configuration.

15. The modular cat station as recited in claim 1 wherein said two successively disposed ones of said plurality of platforms each comprises at least one outer peripheral notch.

16. The modular cat station as recited in claim 15 wherein said outer peripheral notches of said two successively disposed ones of said plurality of platforms are disposed in a staggered relation to one another.

17. The modular cat station as recited in claim 1 wherein each of said platforms are rotatable about said internal support assembly.

18. A modular cat station disposable between a collapsed configuration and an assembled configuration, said modular cat station comprising:

a base, a plurality of vertically aligned, rotatable platform and collar pairs disposed in a removably interconnected relation to said base, each of said platform and collar pairs comprising a platform and a collar, said plurality of platforms comprising a substantially rigid configuration, wherein at least one of said platforms comprises a generally flat, at least partially rounded structure with an outer notch to form an at least partially C-shaped configuration, said outer notch being structured and disposed to allow ingress and egress of an animal therethrough, an internal support assembly cooperatively structured and disposed to removably secure each of said plurality of platform and collar pairs to said base, said internal support assembly comprising at least one elongate shaft connected to said base and disposed at least partially through an internal cavity of each of said plurality of platform and collar pairs, and a plurality of auxiliary members connected to said modular cat station and extending in an at least partially covering relation to at least a portion of said plurality of platforms and plurality of collars, said plurality of auxiliary members being structured to at least partially represent plant life.

19. The modular cat station as recited in claim 18 wherein at least two of said platforms comprise a flat, partially rounded structure with non-aligned outer notches to form a partially C-shaped configuration.

20. The modular cat station as recited in claim 18 wherein said elongated shaft comprises a plurality of shaft members interconnected to one another via an intermediary shaft connector.

21. The modular cat station as recited in claim 20 wherein said intermediary shaft connector comprises two oppositely disposed ends telescopically connected to corresponding ends of said plurality of shaft members.

22. The modular cat station as recited in claim 18 wherein said internal cavity of each of said plurality of platform and collar pairs comprises an internal rigid reinforcement.

23. A modular cat station disposable between a collapsed configuration and an assembled configuration, said modular cat station comprising:

a rigid base disposable in a supporting relation onto a supporting surface, at least one collar extending in an at least partially outward direction from said rigid support base, at least one rigid, non-bendable platform disposed in a spaced apart relation from said rigid support base, said rigid, non-bendable platform comprising an at least partially C-shaped configuration, and a plurality of auxiliary members connected to said modular cat station and extending in an at least partially covering relation to a peripheral edge of said at least one platform, said plurality of auxiliary members being structured to at least partially represent plant life.

* * * * *